Feb. 27, 1940.  D. B. SLACK  2,191,834
ELASTIC HORSESHOE PAD
Filed April 9, 1938
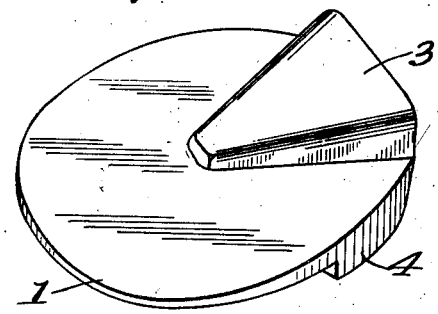
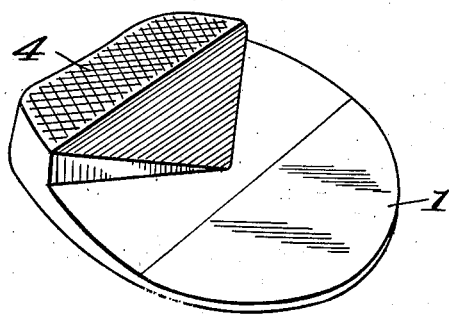
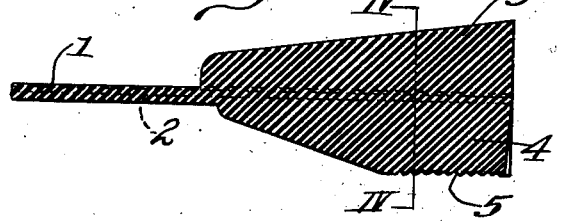
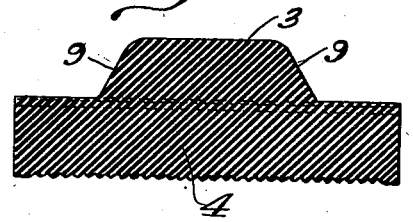
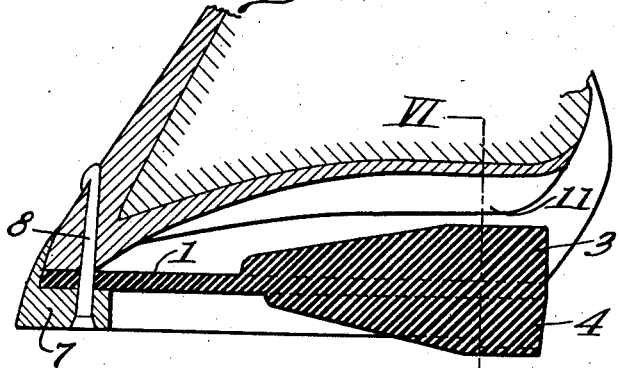
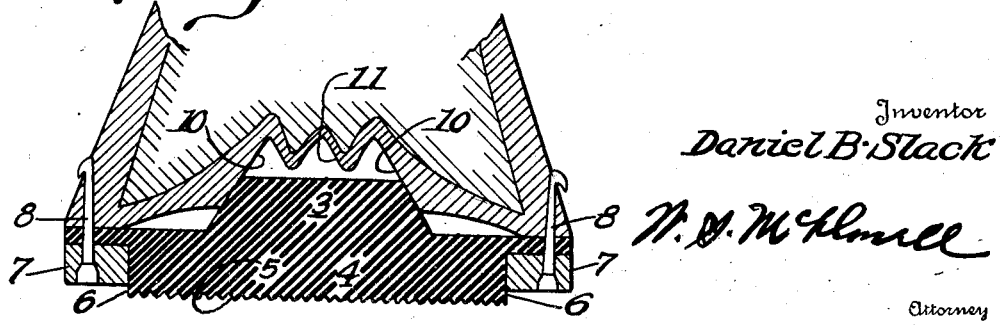
Inventor
Daniel B. Slack
Attorney Patented Feb. 27, 1940

2,191,834

UNITED STATES PATENT OFFICE 2,191,834

ELASTIC HORSESHOE PAD

Daniel B. Slack, Westerville, Ohio

Application April 9, 1938, Serial No. 201,137

5 Claims. (Cl. 168—28)

This invention relates to elastic horseshoe pads and is directed particularly to a pad to be disposed between the horse's foot and the shoe applied thereto for the purpose of correcting and preventing a certain disorder known as contracted heels.

It has been noted in the care and handling of show horses that they are particularly susceptible to the disease of contracted heels because the hard shell-like walls of the hoofs are permitted to grow to such a length that the frog does not contact the ground. Since no contact between the frog and the ground takes place, the blood does not circulate properly in the hoofs and the heels commence to contract, causing the horse to become lame. The present invention has been designed particularly for use on show horses and has been found very effective in preventing as well as curing contracted heels.

The primary object of the invention resides in the provision of a pad having a body conforming in outline to a hoof and having registering enlargements on the top and bottom surfaces of the pad. The enlargement on the top engages the inclined surfaes of the under side of the foot on either side of the frog to cause a spreading of the foot.

It is also an object of the invention to provide a pad of the type mentioned with means for causing a spreading of the foot, the spreading action commencing at the quarters and gradually increasing to the heel portion of the foot.

A still further object resides in providing a pad having an enlargement on the top, this enlargement having upwardly and inwardly inclined side portions which engage the under side of the foot on either side of the frog, the top wall of the enlargement being slightly spaced from the frog to permit the upward movement of the enlargement before engagement with the frog, the upward movement causing a spreading of the foot due to the wedge-like shape of the enlargement.

Other objects will be apparent from the following description taken in connection with the drawing forming a part of this specification.

In the drawing:

Fig. 1 is a perspective view showing the upper side of a pad formed in accordance with the present invention;

Fig. 2 is a similar view showing the under side of the pad disclosed in Fig. 1;

Fig. 3 is a vertical longitudinal sectional view taken through the pad shown in Fig. 1;

Fig. 4 is a vertical transverse sectional view taken on the plane indicated by the line IV—IV of Fig. 3;

Fig. 5 is a vertical longitudinal sectional view taken through a horse's foot with the pad and shoe in place thereon;

Fig. 6 is a vertical transverse sectional view taken on the plane indicated by the line VI—VI of Fig. 5.

Referring more particularly to the drawing, the numeral 1 designates the body portion of the pad. This portion is a thin flat sheet conforming in outline to a horse's hoof and is made of rubber or some similar composition and has embedded therein one or more fabric layers 2 to toughen the body and to prevent premature breakage. Formed integrally with the body 1 on the upper side is an enlarged lug 3. This lug is substantially as wide at the rear end as the rear edge of the body 1. The sides of the lug converge toward the front and terminate substantially in a point at the center of the body 1. The upper surface of the lug is inclined downwardly toward the front in order to conform with the contour of the under side of the horse's foot. A second enlarged lug 4 is provided on the side of the pad at the rear end thereof. The under surface of the pad 4 is serrated as at 5 to prevent the horse's foot from slipping when it engages the ground surface. The enlargement 4 is also as wide at the track as the rear edge of the pad body and conforms in shape to the rear portion of the body for a short distance from the rear edge. The forward portion of the lug 4 also converges and substantially disappears at the center of the body portion. When the pad is applied to the horse's foot, the sides of the lug 4 are trimmed down as at 6 in Fig. 6 to receive the horse's shoe 7 and the pad is disposed between the shoe 7 and the under side of the horse's foot. Securing nails 8 pass through openings formed in the shoe and through the pad into the horn-like covering of the hoof to secure the shoe and pad in connection with the horse's foot.

Prior to attaching the pad to the foot, the lug 3 is trimmed to fit the particular foot to which it is being applied. In trimming the lug 3, the side surfaces 9 are cut to fit the inclined surfaces 10 of the under side of the foot at either side of the frog portion 11. When the proper angle is secured, the upper surface of the lug is also trimmed to provide clearance of approximately one-eighth of an inch between the lug and the frog 11. This clearance will permit some upward movement of the lug before the frog is engaged and due to the wedge-shape of the lug, the foot will be spread apart. When the frog receives the pressure from the lug, the natural pumping action will result. When the horse's foot to which the pad is applied is already contracted, the continuous spreading action will cause the foot to grow back to its normal shape at which time the pad can be removed and need not be replaced until the foot again shows a tendency to contract.

I have found that badly contracted feet can be corrected through continued use of this pad but that the pad must be replaced about every four to six weeks since the foot will respond to the spreading action and the pad will become ineffective in that time. It has also been found desirable to use the pad to prevent the hoof from contracting even when the hoof is in normal condition. The pad need not be used continuously but just often enough to keep the hoof in its natural state. When the pad is in applied position on a horse's foot, the under surface of the lug 5 will be disposed either flush with the bottom surface of the shoe or even a slight distance below the same so that the pressure will be transmitted directly to the upper lug and to the horse's foot. The lugs are extended to the center of the pad and are reduced in thickness at this portion in order that slighter pressure wll be applied to the quarters of the foot and the spreading action will begin at this point.

While I have shown and described my improved pad in its preferred form, I do not desire to be limited by the showing but rather by the scope of the following claims.

What is claimed is:

1. An elastic pad for horses' feet comprising a flat resilient body conforming in outline to a horse hoof, registering enlargements formed integrally with the top and bottom surfaces of said body, the thickness of said enlargements decreasing from the rear of said body to the center thereof, the enlargement on the top being narrower than said body and having inwardly inclined side surfaces.

2. An elastic pad for horses' feet comprising a flat resilient body conforming in outline to a horse hoof, registering enlargements formed integrally with the top and bottom surfaces of said body, said enlargements being relatively thick at the rear of said body and tapering to nothing at the center of said body, the enlargement on the top being widest at the rear end and substantially pointed at the forward end, the side surfaces of said last-named enlargement being inclined toward one another.

3. An elastic pad for horses' feet comprising a flat resilient body conforming in outline to a horse hoof, enlarged lugs provided on the top and bottom surfaces of said body, the rear ends of said lugs being substantially as wide as said body at the back edge thereof, the side surfaces of the top lug converging toward the top and front.

4. In horse shoeing equipment, a pad formed for attachment to the under side of a hoof, said pad comprising a flat resilient body conforming in outline to the hoof, and a lug provided on the upper side of said body, the side surfaces of said lug being inclined to correspond to the inclined under surfaces of the hoof at the sides of the frog portion of the foot, the upper surface of the lug being spaced from the frog when the pad is in applied position and under substantially no pressure.

5. An elastic pad for horses' feet comprising a flat resilient body conforming in outline to a horse hoof, a wedge-shaped lug having upwardly and inwardly inclined side surfaces formed on the upper surface of said body, a second lug provided on the under side of said body in registration with said first lug, the thickness of a portion of said second lug being slightly greater than that of the shoe on which the pad is positioned.

DANIEL B. SLACK.